Dec. 3, 1963 K. GISSEL 3,112,627
CYLINDRICAL MOUNT FOR PHOTOGRAPHIC OBJECTIVES
Filed Nov. 7, 1960
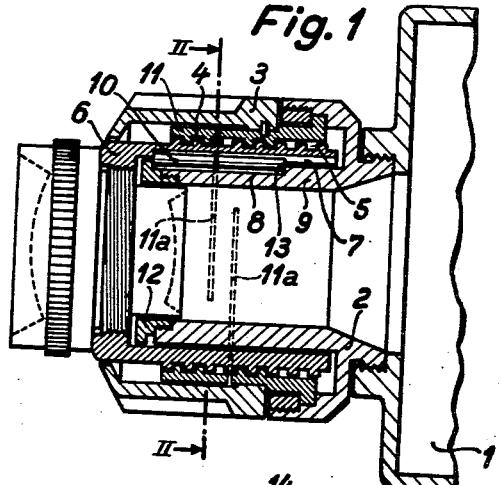
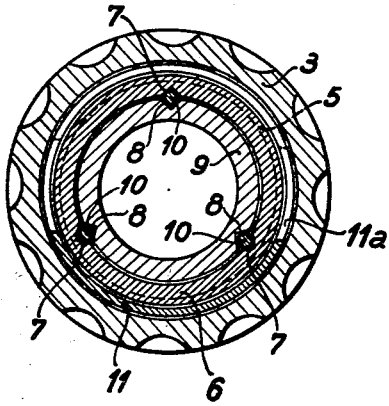
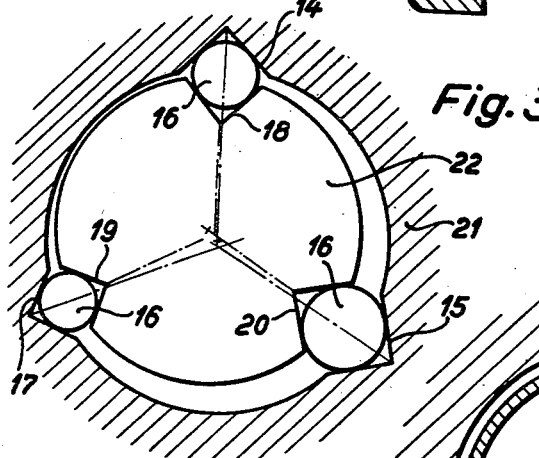
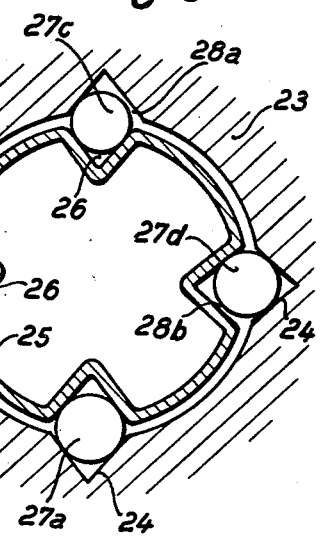
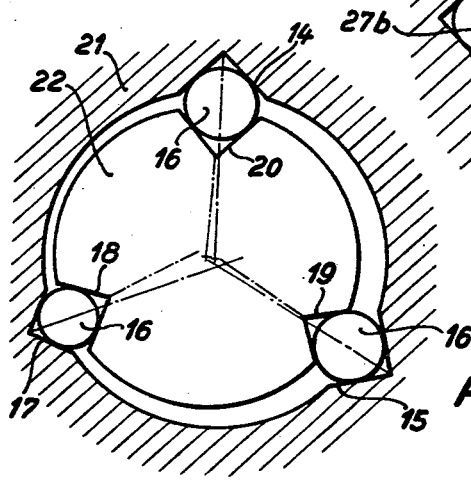
INVENTOR
KURT GISSEL
BY Toulmin & Toulmin
ATTORNEYS

United States Patent Office 3,112,627
Patented Dec. 3, 1963

3,112,627
CYLINDRICAL MOUNT FOR PHOTOGRAPHIC OBJECTIVES
Kurt Gissel, Wetzlar (Lahn), Germany, assignor to Ernst Leitz Gesellschaft mit beschrankter Haftung, Wetzlar (Lahn), Germany
Filed Nov. 7, 1960, Ser. No. 67,748
Claims priority, application Germany Nov. 13, 1959
4 Claims. (Cl. 64—23.5)

The present invention relates to a guide arrangement for linear movement, more particularly to a guide arrangement for a pair of telescopingly nested cylindrical members wherein one of said cylindrical members supports a photographic objective and is capable of axial movement relative to the other cylindrical member which is connected, for example, with a camera housing but rotative movement of the cylindrical members with respect to each other is prevented.

Previously, numerous forms have been devised for assembling two cylindrical members with respect to each other so that the cylindrical members are capable of relative axial movement only. A general form of such a guide arrangement comprises providing at least three equally spaced axial rails on one cylindrical surface which rails slidingly engage corresponding grooves on the other cylindrical surface. The play between the cylinders is dependent upon the quality of the engaging surfaces of the guide rails and the guide grooves. The other surfaces of the cylindrical members have no influence whatsoever on the play between the cylindrical members and, hence, these surfaces are unfinished so as to be rough and inaccurate.

The present invention provides an improved guide arrangement of the general type as described above wherein telescopingly nested cylinders have a high degree of play and the circumferential surfaces of the cylinders are unfinished. The present invention, however, provides for the use of additional elements which are conventional or can be easily produced at low cost and which can be mounted between the nesting cylinders. The use of these additional elements reduces the accuracy required to form the guide grooves in the surfaces of the cylinders. Further, while the guide grooves of these cylinders should have smooth surfaces it is not necessary that these grooves be finished to close tolerances.

The present invention essentially comprises opposed pairs of V-shaped grooves on the cooperating faces of a pair of telescopingly nested cylindrical members. A cylindrical rod is then positioned in each pair of opposed grooves with the rod contacting the surfaces of the grooves so that these surfaces are essentially tangential to the cylindrical rods.

The opposed pairs of grooves may number two, three or more pairs. In case of two or three grooves, there are altogether eight or twelve faces for engaging the rods. When three or more pairs of grooves are employed it is not necessary that all of said cylindrical rods contact the faces of their respective grooves. The criterion is that the number of contact points between the cylindrical guides and the groove faces is sufficiently large so that a tangential as well as a radial displacement of the cylindrical members can be prevented. The grooves have equal circumferential spacing therebetween and each has an angle of substantially 90°.

The invention also discloses a process for forming such a guide arrangement. In this process the cylindrical members, having the axial grooves therein, are positioned in nesting relationship. The cylindrical rods having the largest apparent possible diameter with respect to the size of the cylindrical members are then positioned in the opposed pairs of grooves. The diameters of the rods will be determined by the difference in the diameter between the cylindrical members and also by the tolerances employed in forming the grooves. By trial and error and using rods of various diameters it will quickly be possible to insert the cylindrical rods which will give the desired amount of play between the nested cylindrical members.

The principal advantage of this invention is that no special efforts must be made with respect to finishing either the surfaces of the notches or the surfaces of the cylindrical rods. While the cylindrical rods should also have a smooth surface, as should the faces of the grooves, it is not necessary to produce special cylindrical rods having very close tolerances. Since these cylindrical rods are readily obtained in the regular course of trade in the form of roller-bearing elements and these elements are manufactured in many different dimensions it can be appreciated that no special cylindrical rods need be manufactured for use in the guide arrangement of this invention. Further, the manner in which these cylindrical rods are mounted in the opposed notches does not require any highly skilled labor.

It is, therefore, the principal object of this invention to provide a novel and improved guide arrangement for photographic objectives permitting axial movement thereof but preventing relative rotational movement.

It is another object of this invention to provide a guide arrangement for photographic objectives at a housing which eliminates the necessity for accurate machining and close tolerances of the surfaces of the cylindrical members.

It is a further object of this invention to provide a guide arrangement for telescopingly positioned cylindrical members respectively connected to a photographic objective and a housing such as of a camera, which arrangement readily compensates for a large degree of play between the cylindrical members.

It is an additional object of this invention to provide a process for forming a guide arrangement for telescopingly positioned cylindrical members which will permit only relative axial movement between the cylindrical members.

Other objects and advantages of this invention will become apparent upon reference to the accompanying description when taken in conjunction with the following drawings, wherein FIGURE 1 is a longitudinally sectional view of a photographic objective mounting provided with the guide arrangement of this invention;

FIGURE 2 is a transverse sectional view of the objective mounting and taken along the line II—II of FIGURE 1;

FIGURES 3 and 4 are schematical views showing two embodiments of the cylindrical guide arrangement of this invention utilizing three pairs of grooves and also illustrating the deviation from the dimensions of the components.

FIGURE 5 is a schematical view of the cylindrical guide arrangement of this invention, similar to the views of FIGURES 3 and 4, but showing the use of four pairs of opposed grooves.

Returning now to the drawings, specific embodiments and modifications of the invention will next be described. With particular reference to FIGURE 1, wherein like reference symbols indicate the same parts throughout the various views, there is shown a camera casing 1 having an objective mounting 2 with an adjusting member 3 being rotatably mounted on the objective. The adjusting member 3 has internal threads 4 which cooperate with external threads 5 on the objective member 6. The inner surface of the objective member 6 has three axially extending parallel grooves 7 which correspond to and are opposed from similar grooves 8 at the outer surface of a cylinder 9 of the objective mounting. The grooves 7 and 8 are V-shaped and have an angle of substantially 90°. The opposed grooves thus form apertures or slots which have substantially square cross-sections.

A cylindrical rod 10 is inserted in each pair of opposed grooves. The diameter of the rods 10 is such that the rods contact all of the faces of an opposed pair of grooves. As a result, radial play between the parts 6 and 9 is eliminated. In order to eliminate any axial play in this groove connection the tube 11 of the adjusting member 3 has transversely extending slots 11A which are perpendicular to the optical axis of the objective mounting. A screw ring 12 is threaded into the end of the cylinder 9 so as to abut against the ends of the rods 10 to prevent cylindrical movement of the rods. In addition, the abutments 13 abut on the other ends of the rods so as to prevent axial movement in the other direction.

The adjustment of focusing of the objective is accomplished by rotating the adjusting member 3. This will cause axial movement of the objective carrying member 6 since this member is guided for linear movement by the cylindrical rods 10 engaging the notches 7 of the stationary mount 2. Thus there will be no rotative movement of the objective carrier member 6.

Proceeding next to FIGURES 3 and 4 there is illustrated schematically that different diameters of the cylindrical rods will be employed according to the errors in working of the grooves and cylindrical rods, the dimensional difference between the cylindrical members and the manner in which the cylindrical members are positioned with respect to each other. The diameters of the cylindrical rods do not affect the operation of the guide arrangement. It is preferable, however, that all of the cylindrical rods engage the faces of the V-shaped grooves. In actual practice, however, this might not always be the case.

It is necessary that there is sufficient difference between the diameters of the inner and outer cylinders to permit adjustment of the inner cylinder into the position wherein all of the cylindrical rods engage the faces of the grooves. This difference in diameters is necessary because of errors and dimensional differences described above, which generally cannot be avoided. Under optimum conditions all of the cylindrical rods will have the same dimensions. These conditions will occur in the absence of any errors in working the surfaces of the grooves and where all of the grooves are equally spaced on their respective cylinders. Under these conditions also the cylinders will be concentrically positioned. The above-described working errors and dimensional differences generally produce a relatively small eccentricity which is of no practical importance in so far as operation of the guide arrangement is concerned.

Proceeding next to FIGURE 3 there are illustrated some typical working errors and dimensional differences which may occur in assembling this guide arrangement. These errors and differences are somewhat exaggerated for clarity of illustration. One example of a working error is that the notches 14 and 15 of the outer cylinder 21 have an angle of 90° but the angle of the groove 17 is only 85°. In addition, the grooves are not equally spaced on the respective cylindrical surfaces since there is only an angle of 97° between the grooves 14 and 17 as compared with the normal 120°. Further, all of the grooves of the outer cylinder have different depths which is clearly apparent by comparison of the grooves 15 and 17. There are also working errors on the inner cylinder 22 wherein the groove 18 has an angle of only 85°, the depths of the grooves are different and the angle between the grooves 18 and 19 is only 117°.

When the cylinders 21 and 22 are assembled, so that the respective notches 14 and 18, 15 and 20, and 17 and 19 are respectively opposed, then it will be necessary to use cylindrical rods of the diameters as illustrated.

Proceeding next to FIGURE 4, when the same cylinders as illustrated in FIGURE 3, and having the same refects or inaccuracies, are so assembled that the notches 14 and 20 are opposed from each other, then it will be necessary to use different diameters of the cylindrical rods, as illustrated. It is also seen that the position of the cylinders 21 and 22 relative to each other is changed.

The required sizes of the cylindrical rods 16 can be readily determined by trial and error by inserting two cylindrical rods in two pairs of opposed grooves and then determining the maximum required diameter of the third cylindrical rod. In the event that the third cylindrical rod does not contact all of the faces of this pair of opposed grooves, the two previously inserted cylindrical rods may have to be changed until the cylinders are assembled with each other with no play.

It is possible to employ this invention with only two pairs of opposed grooves instead of the three pairs of opposed grooves as described above. With two pairs of grooves the correct diameters of the cylindrical rods can be more quickly determined. However, the guide arrangement with three pairs of grooves is preferred since it is a much more likely deterrent against the relative rotative movement of the two cylinders and is also more accurate with respect to the axial movement.

Proceeding next to FIGURE 5 there is illustrated a guide arrangement having four pairs of opposed grooves and also showing some examples of working defects and dimensional differences. The outer cylindrical member 23 is provided with axially extending grooves 24 and the inner cylindrical member 26, which is of the hollow type, has axial grooves 25 corresponding in number to the grooves 24. Cylindrical rods 27a, 27b, 27c and 27d are inserted into each pair of opposed grooves. The two rods 27a and 27b are first inserted, and each rod correspondingly contacts the four faces of its respective grooves. This, however, will not necessarily be true to the remaining cylindrical rods 27c and 27d. The play between the cylindrical rods 27c and 27d and their respective groove faces is indicated at 28a and 28b. Since, however, the groove angles are about 90°, the faces adjoining the face at, for example, 28a, may be parallel, so that rod 27c may be able to move along the said two parallel faces and simultaneously out of engagement with the other two faces. The same holds true for rod 27d so that in this embodiment out of sixteen groove faces only twelve thereof contact rods permanently. It is pointed out, however, that the play indicated at 28a and 28b does not influence the play of the entire guide arrangement since there will be groove-face contacts on all sides of the cylindrical members. This, of course, is provided when cylindrical rods, having a maximum diameter, are employed.

The guide arrangement as shown in FIGURE 5 has a disadvantage in that the cylindrical rods are susceptible to locking. For this reason it would be desirable that the grooves in both the inner and outer cylindrical members be provided with different angles. If structural demands permit, either the inner or outer cylinders can be made hollow and provided with such a thin wall thickness that the hollow member is resilient. This resiliency will then compensate for numerous structural defects. The use of resilient tubular members for either or both of the cylindrical members will greatly facilitate obtaining contact between the faces of the grooves and the guide elements disposed therein.

The cylindrical rods used may have any cross-section, however, the requirement that the rods contact the faces of the grooves is most easily met by utilizing rods of a circular cross-section. A plurality of rods of a stortened length may also be inserted in each pair of opposed grooves. In addition, a plurality of spherical bearing members may be inserted in a pair of the opposed grooves. Wtih spherical members, however, all of the members in one pair of grooves must have the same diameter.

This guide arrangement finds its greatest utility in axially displaceable members such as photographic equipment objective mountings wherein it is desired to prevent relative rotative movement between axially moveable parts.

Thus it can be seen that the present invention provides a guide arrangement for linear movement which does not depend on close tolerances of the engaging surface for proper operation. Further, the guide arrangement can be easily assembled without the necessity of employing highly skilled labor. Further, proper operation of the axially displaceable parts does not require a concentric assembly of these parts.

It will be understood that this invention is susceptible to modification in order to adapt it to different usages and conditions and, accordingly, it is desired to comprehend such modifications within this invention as may fall within the scope of the appended claims.

What I claim is:

1. Cylindrical mount for photographic objective mounted at a housing, the combination comprising: a first cylindrical member connected to said housing; a second cylindrical member telescopically received with play by said first member and being connected to said objective; said first and second members each having a plurality of respectively oppositely positioned, V-shaped grooves so that each pair of oppositely positioned grooves defines a cavity with four axially extending faces; and a plurality of cylindrical rod members including at least two members of different diameters, respectively positioned in said cavities engaging said groove faces thereof for positively preventing relative tangential and rotary movement between said first and second members.

2. Cylindrical mount for a photographic objective mounted at a housing, the combination comprising: a first cylindrical member connected to said housing; a second cylindrical member telescopically received with play by said first member and being connected to said objective; said first and second members each having a plurality of $n$ respectively oppositely positioned, V-shaped grooves, so that each pair of oppositely positioned grooves defines a cavity with four axially extending faces; there being altogether $4n$ groove faces; and a plurality of $n$ cylindrical rod members including at least two of different diameters and being respectively positioned in the pairs of opposing grooves, there being at most $4n-12$ groove surfaces not directly contacting a rod member.

3. Cylindrical mount for a photographic objective mounted at a housing, the combination comprising: a first cylindrical member connected to said housing; a second cylindrical member telescopically received with play by said first member and being connected to said objective; said first and second members each having a plurality of respectively oppositely positioned, V-shaped grooves so that each pair of oppositely positioned grooves defines a cavity with four axially extending faces; a plurality of cylindrical rod members including at least two members of different diameters, respectively positioned in said cavities engaging said groove faces thereof for positively preventing relative tangential and rotary movement between said first and second members; and means on said first and second members preventing axial movements of said rod members without restricting axial movement of said first and second members.

4. Cylindrical mount for photographic objective mounted at a housing, the combination comprising: a first cylindrical member connected to said housing; a second cylindrical member telescopically received with play by said first member and being connected to said objective; said first and second members each having three respectively oppositely positioned, V-shaped grooves so that each pair of oppositely positioned grooves defines a cavity with four axially extending faces; and three cylindrical rod members including at least two members of different diameters, respectively positioned in said cavities engaging said groove faces thereof for positively preventing relative tangential and rotary movement between said first and second members.

References Cited in the file of this patent

UNITED STATES PATENTS

| | | |
|---|---|---|
| 754,066 | Hoffmann | Mar. 8, 1904 |
| 846,079 | Yost | Mar. 5, 1907 |
| 2,338,093 | Caldwell | Jan. 4, 1944 |
| 2,992,548 | Muller et al. | July 18, 1961 |